Aug. 7, 1928.  
C. E. SUMMERS  
1,679,995

TORSIONAL VIBRATION INDICATOR AND RECORDER

Filed Jan. 21, 1925  3 Sheets-Sheet 1

Inventor  
Caleb E. Summers

By Spencer, Sewall & Hardman,  
his Attorneys

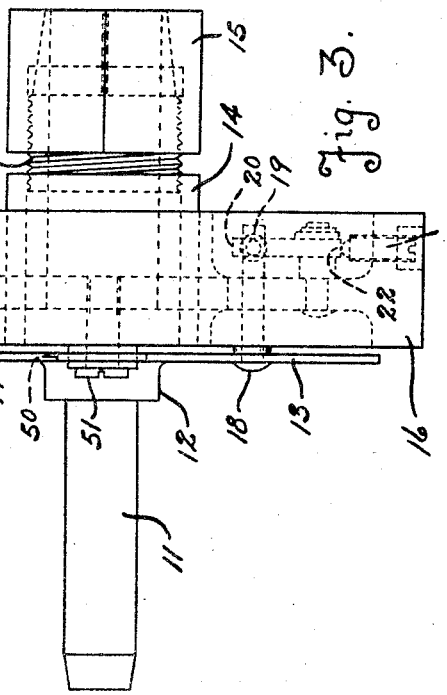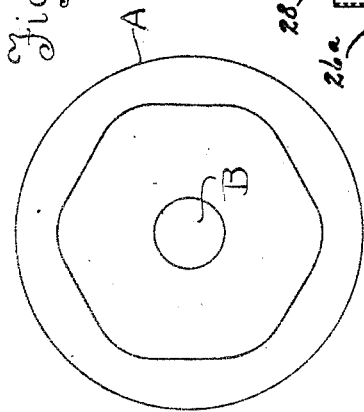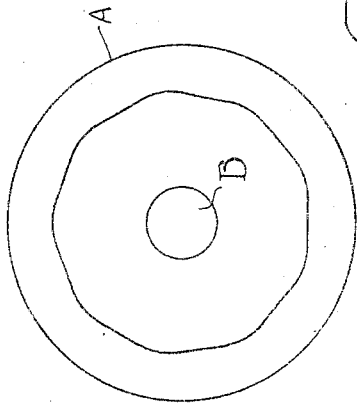

Patented Aug. 7, 1928.

1,679,995

UNITED STATES PATENT OFFICE.

CALEB E. SUMMERS, OF DAYTON, OHIO, ASSIGNOR TO GENERAL MOTORS RESEARCH CORPORATION, OF DAYTON, OHIO, A CORPORATION OF DELAWARE.

TORSIONAL VIBRATION INDICATOR AND RECORDER.

Application filed January 21, 1925. Serial No. 3,723.

This invention relates to instruments for detecting torsional vibration in shafts and for indicating and recording their period and amplitude; it is designed particularly to aid in ascertaining facts and to record data with respect to the torsional vibration of crankshafts of internal combustion engines.

The invention of this application is an improvement upon that disclosed and claimed in U. S. Patent to Caleb E. Summers, dated February 2nd, 1926, No. 1,571,349, and the improvements particularly concern the instrumentality for receiving a record of the vibrations indicated by the detecting and indicating instrument disclosed in that patent.

In the accompanying drawings, in which like reference characters indicate like parts throughout the several views:

Fig. 3 is a side elevation thereof;

Fig. 4 is a side elevation of a record sheet holding device adapted to receive a record of the amplitude and frequency of vibrations indicated by said indicating instrument;

Figs. 7 and 8 represent record sheets or cards which have had a record of torsional vibrations made on them by a stylus on the indicating and recording instrument.

Figure 1:
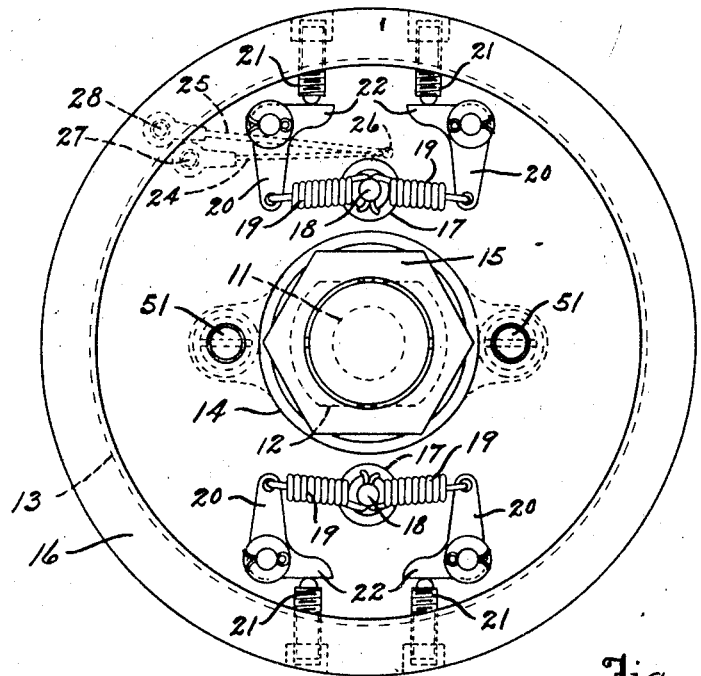
Fig. 1 is a rear elevation of an instrument for detecting, indicating and recording torsional vibration in the crankshaft.
Figure 2:
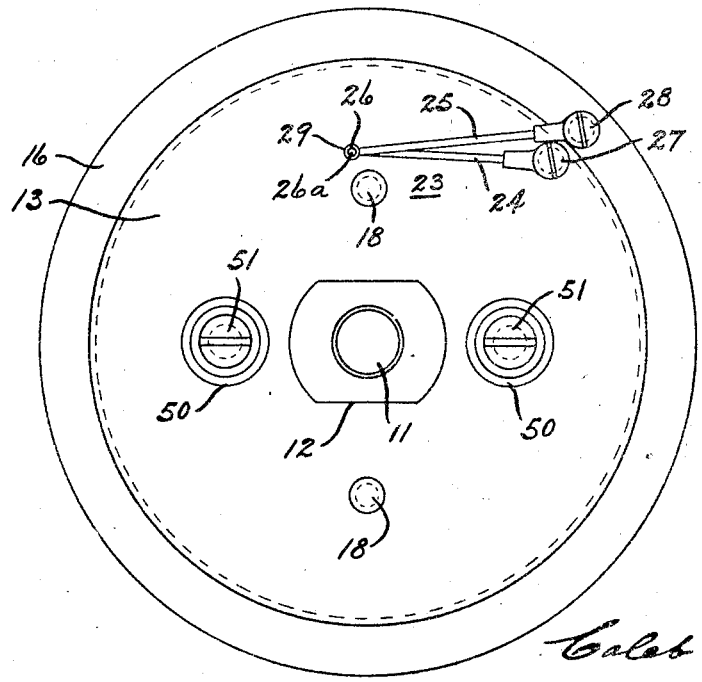
Fig. 2 is a front elevation of the instrument shown in Fig. 1.
Figure 5:
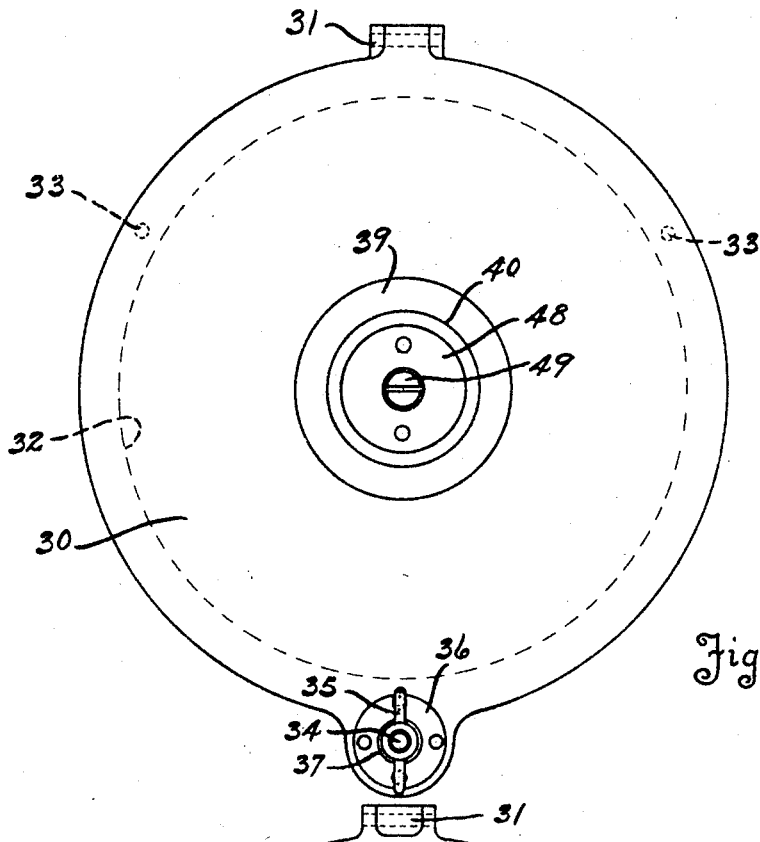
Fig. 5 is a front elevation of the record sheet receiving device.
Figure 6:
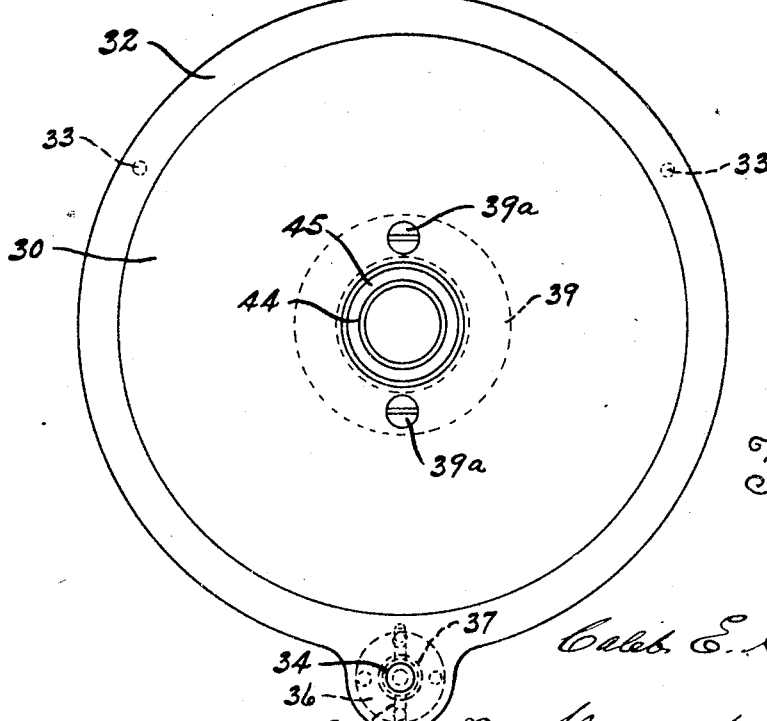
Fig. 6 is a rear elevation thereof.

The torsional vibration detecting, indicating and recording instrument shown in Figs. 1, 2 and 3, comprises: (1) a comparing member partaking of all the movements of a shaft to be tested and having an element, the movements of which may be compared with a steadily moving member serving as a standard of comparison, and, (2) a steadily moving member rotating at the average speed of the shaft to be tested, but not partaking of its torsional vibrations, which serves as a standard of comparison.

The comparing member comprises a split collet 10, a co-axial forward projecting bearing stud 11, a flat sided shoulder 12, a relatively light disc or other comparing element 13, and a bearing bushing 14, preferably of bronze.

All parts thus far mentioned, except the bushing, are formed of one integral piece or of separate pieces rigidly fastened together. A nut 15 may be screwed upon the end of the split collet to secure the instrument upon the front end of an internal combustion engine crankshaft or upon an adapter secured to said shaft.

Mounted upon the bearing bushing 14, so as to be capable of moving angularly with respect to it, is a fly-wheel or other inertia mass 16, constituting the member having a comparatively steady rotation, with which the movements of the shaft may be compared. The flywheel 16 is prevented by any suitable means from moving longitudinally of the bushing, but is free, within limitations, to move angularly with respect thereto, or to permit the oscillation of the disk and bushing-carrying member within the bearing opening of the flywheel. The means whereby the disk carrying member may oscillate, within limits, with respect to the flywheel, are shown in Fig. 1. In this figure, 17 indicates diametrically opposite holes through the web of the flywheel; 18 are pins connected to the disk 13 which project through said holes. These pins 18 are connected to springs 19, the opposite ends of which are attached to small bell crank levers 20. Adjusting screws 21, threaded through the rim of the flywheel, bear upon the arms 22 of said bell crank levers and serve to apply greater or lesser tension to the springs 19, according to the adjustment of said screws.

With this construction it will be seen that the detecting and indicating instrument may be readily secured upon the end of a crankshaft by inserting the end of the crankshaft (or the end of an adapter) in the split collet 10 and tightening up the nut 15 while holding the instrument from rotation by a wrench applied to the flat sides of the shoulder 12; now, when the engine is rotating it will be apparent that any torsional vibration of the crankshaft will not interfere with the steady running of the flywheel 16 but that the member carrying the comparatively light disk 13 will be angularly displaced alternately with respect to the flywheel or will oscillate within the flywheel, the oscillations expending their force upon the springs 19 which substantially absorb them.

The indication of the frequency and amplitude of the objectionable torsional vibration, if there is any, will be given by the free end of an indicator arm 23, shown in Figs. 2 and 3. This indicator arm consists of two somewhat elastic limbs, 24 and 25, connected at 26, one limb 24 being pivoted to the light disk 13 and the other limb 25 to the flywheel as shown at 27 and 28 respectively. Projecting forward co-axial with the point 26 is a stylus 26ª. Surrounding the point 26 and stylus, there is, preferably, a brilliantly white indicating disc 29, the movements of which the eye can readily follow, as the background on the face of the disk and flywheel is preferably dull black.

The indicator arm should, preferably, be of such length and so disposed that a line drawn from the axis of rotation of the instrument to the stylus meets the normal line of direction of the indicating arm at approximately, though preferably a little less, than a right angle, as shown in the drawings, so that the stylus and indicating disk move in a direction approximately radial. Most internal combustion crankshafts, rotate counterclockwise. The instrument illustrated is designed for detecting torsional vibrations in a counterclockwise rotating shaft. Now as the centrifugal force acting upon the indicating arm tends to throw the free end outward away from the center, the pivotal points 27 and 28 thereof have been so placed that they are in advance of the stylus, so that the indicator arm trails, as it were, when the instrument is rotating normally. Owing to this arrangement the resistance of the air tends to counteract the effect of the centrifugal force, whereas it has been found that when the indicator arm is oppositely disposed, air pressure is added to centrifugal force, tending to throw the stylus outward. It will be apparent that, if the crankshaft has no torsional vibration, the point 26 and disk 29 will describe a circle around the axis of the instrument and this will appear to the eye as a white circular zone, owing to persistence of vision and speed of rotation. If there is any considerable torsional vibration in the crankshaft, the relative angular displacements of the comparing disc 13 and the standard flywheel 16, due to these vibrations, will cause the stylus 26ª and indicating disk 29 to move in and out in directions approximately radial. This will cause the indicating disk 29 to trace a figure which departs from a circle, in accordance with the amplitude and frequency of the vibrations of the shaft. The number of lobes of this figure will give information as to the frequency of vibration, and the extent of departure from a circle will give information as to the amplitude of the vibrations. In the instrument shown, the indicating arm is so proportioned that a magnification of about 5 to 1 is afforded.

Fig. 2 shows two holes 50 diametrically opposed to each other in the disc 13. These holes are for the purpose of receiving studs 51 which project into them from the wheel 16 and which are surrounded by some yielding material such as rubber or leather. The covered studs serve as limiting buffers to prevent so great an angular displacement between the flywheel and the disk 13 as to throw the pointer excessively outward or inward, as might happen in case of some abnormal condition, such as the engine missing fire on one or more of the cylinders.

The construction thus far described is substantially disclosed and claimed in said prior Patent No. 1,571,349. The improved record receiving instrumentality will now be described.

In order that a permanent record may be taken of the frequency and extent of vibration caused by harmonic relations between the thrusts of the connecting rods and the natural period of a shaft, a record receiving device is provided such as is shown in Figs. 4 to 8 inclusive. This device comprises two members one of which is a flat disk or plate 30 to which is hinged, at 31, the other member consisting of an open center clamp such as ring 32. Between this clamping ring and the disk or plate 30 a record receiving sheet or card A such as is shown in Figs. 7 and 8, may be clamped. In order to insure against slipping of the card, small points or bosses 33 are made in the clamping ring, these bosses bearing upon the paper of the record card when it is held between the clamping ring and the disk. In order to clamp the ring 32 firmly to the disk so as to hold the record sheet or card, the members are equipped with permanently attached co-acting threaded elements. In the embodiment illustrated, the ring is provided with a fixed threaded stud 34, while the disk carries swiveled within an outward extending housing 36, a thumb nut 35. The housing 36 has a flange 37 at its outer end adapted to engage with a corresponding flange 38 on the nut. By this means neither the nut nor the stud can be separated from the device. Both are always in place ready to be tightened when the clamping ring is closed.

The disk or plate 30 is secured to a handle 39, preferably of wood, by countersunk wood screws 39ª. This handle has a metallic liner 40 shouldered internally at 41 and screw threaded internally at 42. Nicely fitted inside of the liner 40 is a centering sleeve or tube 43 which flares internally at its outer extremity as at 44. The outer end 45 projects slightly beyond the disk 30 and is capable of adjustment in or out so as to vary the amount of its projection. Upon the opposite or inner end of the centering tube 43 is a covering plate or head 46. This head is movable within the space between the shoulder 41 and a nut or annular plate 48 held by the thread 42. Between the head 46, which is slightly larger than the centering tube, and the shoulder 41, and surrounding the centering tube, is a coil spring 47, which, as will be seen, constantly urges the centering tube toward the extremity of the handle, so as to reduce the extent of projection of the end 45. The plate 48 is threaded into the threaded end 42 of the lining 40. This plate is provided with spanner holes so that it may be adjusted as desired, although it is intended to be screwed in and jammed at the inside end of the threaded portion. The plate 48 has a central threaded hole engaged by a screw 49 the inside end of which bears normally against the center of head 46 of the centering sleeve.

It will be seen that by adjusting the screw 49 toward disk 30, the end 45 of the centering sleeve may be projected farther beyond the surface of the disk 30 and by turning it in an opposite direction, the spring 47 will retract the centering sleeve, so as to lessen the extent of projection of said end. The end 45 of centering sleeve is adapted to engage with a central hole B in a record card A, such as is shown in Figs. 7 and 8, and facilitates locating the card accurately in place, although no great degree of accuracy is of course, necessary. The internal flare 44 of the centering sleeve functions as a finder or pilot to facilitate slipping it over the bearing stud 11. The projecting end 45 also serves as a stop to limit the movement of the device holding the record card toward the recording stylus of the indicating instrument. The stop may be adjusted by the means described to allow the card to approach the face of the indicating and recording instrument more closely, as may be necessary when the stylus becomes shortened by wear. The stop, of course, further functions to prevent the record card from being pressed so firmly against the end of the stylus as to cut or tear the card or injure the stylus.

The record sheet card is made of specially surfaced paper upon which brass will make a black mark. The stylus is made of brass in order to mark upon the specially prepared paper and, of course, possesses a strong marking point not easily broken.

When the indicating instrument has been applied to the engine shaft or to an adapter secured to the shaft, if the shaft should not be of a diameter suitable to fit nicely within the collet, the engine is started and the white indicating disk 29 is watched. When the figure presented to the eye departs from a circle, as indicated for example in Fig. 7, it will be known that the engine has reached a speed where the natural period of torsional vibration of the crankshaft harmonizes with the thrusts given by the connecting rods and that one critical speed has been attained in which disagreeable or harmful vibration occurs. The speed at which this occurs will then be determined and the record receiving card may be applied to the instrument by grasping the handle in the hand, slipping the centering sleeve over the bearing stud 11 and, at the proper instant, pushing the record card quickly against the stylus so that the outline followed by the stylus will be reproduced upon the record card and a record chart will be made. The record receiving instrument should be held in place only for a very brief period, as during one or two revolutions. From this record it can be readily calculated at what other speeds disagreeable or harmful vibrations will be set up. The record chart shown in Fig. 7 indicates that the crankshaft vibrated 9 cycles to each revolution when the speed equaled 1400 R. P. M. The record chart shown in Fig. 8 has on it a figure traced by the same engine at 2100 R. P. M. showing that at that time the crankshaft had attained another speed where the natural periodical vibrations of the shaft harmonized with the thrusts of the connecting rods so as to impart six cycles of vibration to each revolution.

The record charts shown in Figs. 7 and 8 were made by a six cylinder four stroke cycle engine, which, of course, applies three firing impulses to the crankshaft at each revolution. The number of "loops" extending outside of the ideal circle, made on the record chart when there is no torsional vibration will, in the case of a six cylinder engine, be three or a multiple of three, when torsional vibration is detected. In practice the three-looped figure occurs usually at a speed above the driving range and the loops of the twelve and fifteen sided figures are too small to be important; that is, the vibrations recorded are practically negligible. The six and nine sided figures, as shown in Figs. 7 and 8, indicate conditions to be remedied as they occur within usual driving speeds.

The instrument when used as described gives a true reading on the record chart of the amplitude of torsional vibrations and the frequency of the vibrations; it enables the speeds at which these vibrations occur to be ascertained. The amplitude of the vibrations is in proportion to the extent of in and out movement of the stylus, represented in the figure on the chart by the radial distance between two concentric circles respectively tangent to the parts of the figure farthest from and nearest to the center. In practice, as before stated, the proportion of the angular amplitude shown on the chart to the actual angular amplitude is 5 to 1. The rate of vibration per second will be the number of vibration cycles (represented by the number of lobes on the record figure that lie outside of the ideal circle) observed or recorded in a revolution multiplied by the engine speed—R. P. M.— and divided by 60. The engine speed at which critical vibration periods occur is determined by measuring the engine speed when the figure traced by the white disk ceases to be a circle and becomes a polygonal figure having three, six or nine sides or lobes, as indicated on the charts depicted in Figs. 7 and 8. A record may then be traced on the record sheet or card, thus obtaining a chart on which the speed may be written,—also the load or other desired data.

The specific details of construction described and illustrated may be varied without departing from the spirit of the invention. It is not essential for example that the card clamping devices be circular in outline, or that the comparing element 13 be a disk. These and other elements have been made as illustrated for the purpose of embodying the invention in the best form now known, but it is not intended to limit the scope of the invention otherwise than by the definition of the claims.

What is claimed and desired to be secured by Letters Patent is as follows:

1. A record receiving instrument comprising a plate having an opening, a handle, a centering sleeve within the handle having an open end projecting through the opening beyond the face of the plate and means for holding a record receiving sheet on the plate.

2. An instrument of the kind defined in claim 1, combined with a device at the outer end of the handle arranged to adjust the centering sleeve.

3. An instrument of the kind defined in claim 1, in combination with an adjusting device comprising a nut rigid with the handle and a screw engaging with the internal threads of the nut and bearing upon the centering sleeve.

4. An instrument of the kind defined in claim 1 in combination with a sleeve retracting spring, a nut rigid with the handle and a screw threaded in the nut bearing upon the centering sleeve and adapted to move said sleeve in opposition to the pressure of the spring.

5. A record receiving instrument comprising two members, one of which is a plate having a smooth surface on one side and a handle projecting from the other side, the other member consisting of on open center clamp hinged at the edge of the plate; and means opposite the hinge for clamping said two members with a record sheet held between them and in contact with the smooth surface of the plate.

In testimony whereof I hereto affix my signature.

CALEB E. SUMMERS.